Aug. 5, 1969  J. S. COGLAITI, JR., ET AL  3,459,497
INCREASING THE BULK DENSITY OF SODA ASH BY ADDING CALCIUM
AND MAGNESIUM IONS PRIOR TO PRECIPITATION
Filed March 10, 1967

INVENTOR.
JOSEPH S. COGLAITI, JR
DANIEL J. MASTERSON
BY
Edwin H. Baker
PATENT ATTORNEY

United States Patent Office 3,459,497
Patented Aug. 5, 1969

3,459,497
INCREASING THE BULK DENSITY OF SODA ASH BY ADDING CALCIUM AND MAGNESIUM IONS PRIOR TO PRECIPITATION
Joseph S. Cogliati, Jr., and Daniel J. Masterson, Green River, Wyo., assignors to Stauffer Chemical Company, New York, N.Y., a corporation of Delaware
Continuation-in-part of application Ser. No. 315,896, Oct. 14, 1963. This application Mar. 10, 1967, Ser. No. 622,172
Int. Cl. C01d 7/26, 7/00
U.S. Cl. 23—63                                                                                       4 Claims

ABSTRACT OF THE DISCLOSURE

Process for consistently producing soda ash of high bulk density (around 57 to 63 lbs./ft.$^3$) wherein sodium carbonate is precipitated from an aqueous sodium carbonate solution, separated and dried by adding $Ca^{++}$ and $Mg^{++}$ to the aqueous sodium carbonate solution prior to precipitation of sodium carbonate. The amount added should be sufficient to permit at least 400 p.p.m. of both $Ca^{++}$ and $Mg^{++}$ (as calcium carbonate on a soda ash basis) to be found in the precipitated sodium carbonate provided that the minimum amounts of $Ca^{++}$ and $Mg^{++}$ that are found in the precipitated sodium carbonate are, respectively, 260 and 100 p.p.m. (as calcium carbonate on a soda ash basis).

---

This application is a continuation-in-part application of pending application Ser. No. 315,896, filed Oct. 14, 1963, now abandoned.

Normally, in the production of soda ash, the sodium carbonate source is chemically produced by the Solvay process or found naturally in the form of sodium carbonate deposits in dry lakes as at Owens Lake, Calif. and in underground deposits as in the Green River, Wyo. area. When using any of such sodium carbonate sources, the critical portion of the various processes with respect to the bulk density of the product is the precipitation of the sodium carbonate from solution. The shape of the precipitated crystals rather than the density of the crystals is the major factor in determining the bulk density of the product since the density of the crystals is nearly uniform while the crystal shape varies widely.

By the present invention, a soda ash of more uniform high bulk density (around 57 to 63 lbs./ft.$^3$) is consistently produced. Such uniform high bulk density soda ash known in the trade as dense soda ash. This is accomplished by adding sufficient amounts of $Ca^{++}$ and $Mg^{++}$, preferably as calcium and magnesium salts or solution thereof to the aqueous solution of sodium carbonate from which the sodium carbonate is precipitated so that certain amounts (hereafter specified) of $Ca^{++}$ and $Mg^{++}$ are found in the precipitated sodium carbonate. Preferably the sodium carbonate is precipitated in the form of its mono-hydrate. The precipitated sodium carbonate is then separated from the sodium carbonate solution and dried. While the exact mechanism for controlling bulk density of the soda ash by the present invention is not known with certainty, it is certain that these additives when used together do effect the production of soda ash of more uniform bulk density whether they act directly to produce such results or they merely block an undesirable effect of other impurities or the like. What is known is that in order to consistently produce a dense soda ash it is necessary to add both $Ca^{++}$ and $Mg^{++}$ to the sodium carbonate solution prior to precipitation of sodium carbonate therefrom so that certain amounts of $Ca^{++}$ and $Mg^{++}$, hereafter specified, are found in the precipitated sodium carbonate. It is believed that the $Ca^{++}$ and $Mg^{++}$ that are obtained in the precipitated produce are those that exceeded the solubility limit of the $Ca^{++}$ and $Mg^{++}$ in the sodium carbonate solution from which the sodium carbonate was precipitated. Correspondingly, the $Ca^{++}$ and $Mg^{++}$ that remained in solution during the precipitation will not be found in the precipitated calcium carbonate.

In the practice of the present invention, the aqueous sodium carbonate solutions resulting from the standard commercial soda ash processes after removal of impurities are treated with $Ca^{++}$ and $Mg^{++}$ preferably as soluble salts or solutions of magnesium and calcium. Any salts of these materials may be used in the present invention. Preferably such materials are sufficiently soluble to meet the minimum concentration requirements. Calcium chloride and magnesium chloride are the preferred form of the additives only due to the fact of good solubility and their economical cost.

The $Ca^{++}$ ion of the calcium salt and the $Mg^{++}$ ion of the magnesium salt must be added to the aqueous sodium carbonate solution from which sodium carbonate is precipitated in an amount sufficient so that at least 440 p.p.m. $Ca^{++}$ and $Mg^{++}$ (as calcium carbonate on a soda ash basis) are found in the precipitated soda ash providing that the minimum amount of $Ca^{++}$ and $Mg^{++}$ found in the precipitated soda ash is respectively 260 and 100 p.p.m. (as calcium carbonate on a soda ash basis).

In a more preferred practice of this invention, $Ca^{++}$ and $Mg^{++}$ are added to the aqueous sodium carbonate solution from which sodium carbonate is precipitated in amounts sufficient so that about 400 to 650 p.p.m. $Ca^{++}$ and $Mg^{++}$ (as calcium carbonate on a soda ash basis) are found in the precipitated sodium carbonate, provided that the minimum amounts of $Ca^{++}$ and $Mg^{++}$ so found are, respectively, 260 and 100 p.p.m. (as calcium carbonate on a soda ash basis) and the maximum amounts of $Ca^{++}$ and $Mg^{++}$ so found are, respectively, 450 and 250 p.p.m. (as calcium carbonate on a soda ash basis).

Even more preferred the process of this invention is a continuous one.

The presence of more than 650 p.p.m. of both the $Ca^{++}$ and $Mg^{++}$ (as calcium carbonate on a soda ash basis) in the precipitated soda ash is undesired since it reduces the purity of the soda ash without any additional improvement in the bulk density of the soda ash.

Preferably the $Ca^{++}$ and the $Mg^{++}$ should be added to the aqueous sodium carbonate solution just prior to precipitation of the sodium carbonate therefrom. Thus, the addition should be made to a sodium carbonate solution held in a storage vessel from which the solution is fed into a precipitator or precipitators or it can be directly added to the precipitator or precipitators.

The amount of $Ca^{++}$ and $Mg^{++}$ that must be added to the solution of sodium carbonate from which sodium carbonate is precipitated so that the specified amounts of these ions are found in the precipitated sodium carbonate will vary, for example, on such factors as the amount of $Ca^{++}$ and $Mg^{++}$, if any, already in the solution and the solubility of these ions at the time of precipitation. The solubility of the $Ca^{++}$ and the $Mg^{++}$ ions will vary depending on such factors as the concentration of the sodium carbonate in solution, temperature at which the precipitation is run and the amount of precipitated sodium carbonate in the solution. However the amount of $Ca^{++}$ and $Mg^{++}$ that must be added to the sodium carbonate solution from which sodium carbonate is precipitated to obtain the amounts of $Ca^{++}$ and $Mg^{++}$ in the precipitated sodium carbonate, herein specified, can be readily determined by those skilled in the art.

In all processes for preparing soda ash it has been found that the amount of $Ca^{++}$ and $Mg^{++}$ found in the sodium carbonate solution from which sodium carbonate is precipitated, without an addition of them, is not nearly enough to consistently produce a high bulk density soda ash. The small amount of $Ca^{++}$ and $Mg^{++}$ normally found in sodium carbonate solution of processes for preparing soda ash comes from two sources. These are the chemicals and water, hard or softened, used in the preparation of soda ash.

The drawings clearly show the improved results of the use of both additives with respect to the use of either additive alone. These graphs express the results of multiton/hour production from a continuous plant in which the sodium carbonate is precipitated from aqueous sodium carbonate solutions. Each graph indicates the bulk density of soda ash produced at any given time during the run. Each run was initiated after the process had come to equilibrium using 100 p.p.m. calcium chloride and/or 50 p.p.m. epsom salts and this concentration was continuously maintained throughout the runs, so that at least 260 and 100 p.p.m. $Ca^{++}$ and/or $Mg^{++}$ as calcium carbonate on a soda ash basis, respectively, are found in the precipitated sodium carbonate.

Figure 1:
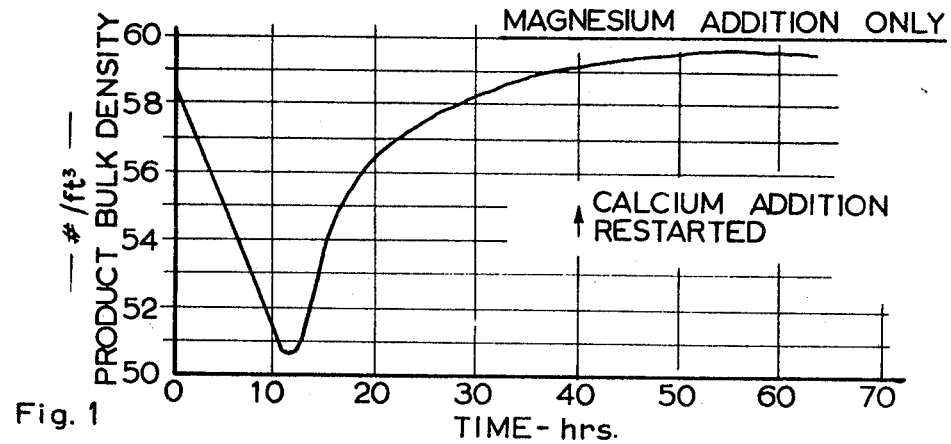
FIG. 1 is a graph showing bulk density of soda ash produced in a continuous process using only a magnesium salt additive.

In the run depicted by the graph of FIG. 1, aqueous calcium chloride solution addition was stopped at hour zero and restarted 11.5 hours later. As shown, the bulk density of the product immediately began to fall from a bulk density of 59 plus lbs./cu. ft. to a bulk density of about 50.6 lbs./cu. ft. when the calcium chloride addition was again started.

Figure 2:
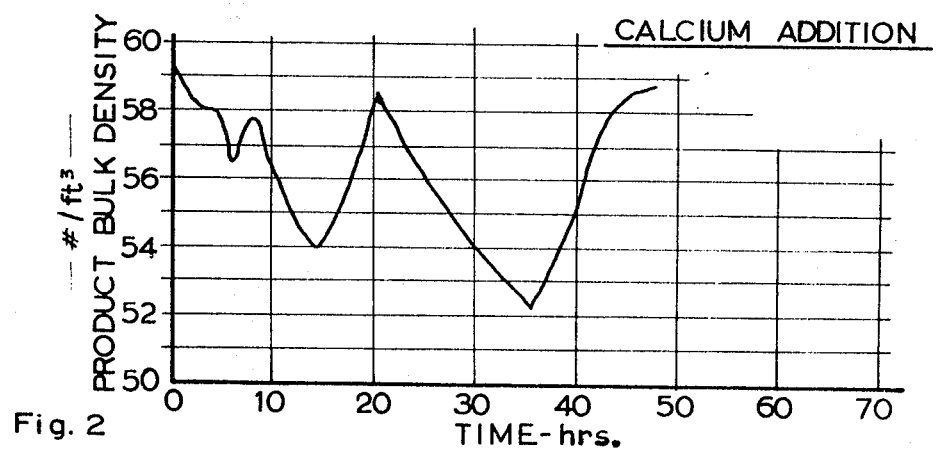
FIGURE 2 depicts a graph showing the bulk density of soda ash produced in a continuous process using only a calcium salt additive.

In the second run depicted in FIG. 2, aqueous epsom salts solution addition was stopped hour zero and as shown the resulting bulk density fluctuated wildly while aqueous calcium chloride solution was the only additive used.

Figure 3:
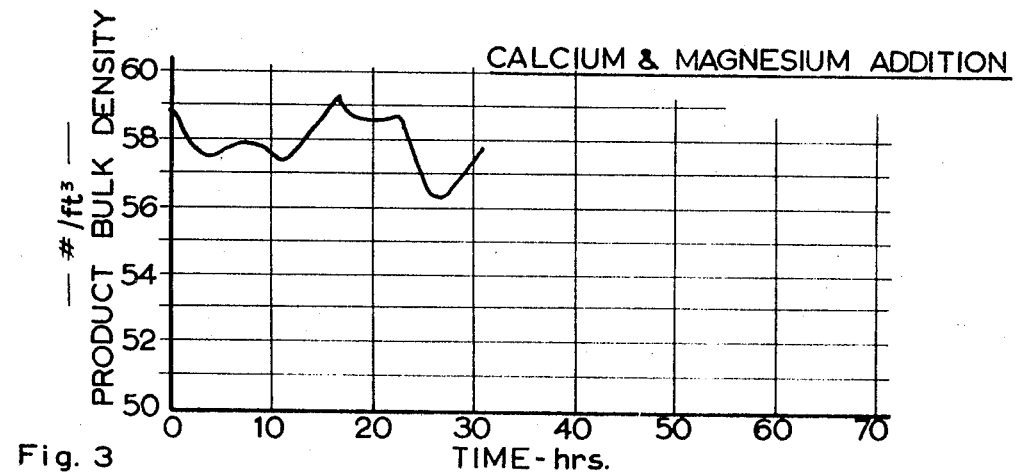
FIGURE 3 is a graph showing the bulk density of soda ash produced in a continuous process using a combination of magnesium and calcium salts.

Run 3, which results are depicted in FIG. 3, shows only a mild fluctuation in bulk density when the present invention was practiced.

During each of the above runs all process variables were held constant with the exception of the particular additives employed.

Such uniformly high-bulk-density soda ash as is produced by the practice of the present invention is most desirable from the uniform quality aspect and the shipping aspect since shipment of such high bulk density material results in the accrual of freight savings. Likewise, many uses of soda ash require the use of uniform material for any degree of reproducibility. In addition, storage space is minimized when the high bulk density soda ash is used.

Many other advantages and variations in the present invention are readily obvious to those skilled in the art and, therefore, the scope of the invention should be limited only as defined in the appended claims.

We claim:

1. An improved process for producing a more uniform, high bulk density soda ash wherein sodium carbonate is precipitated from an aqueous sodium carbonate solution, separated and dried, said improvement comprising adding $Ca^{++}$ and $Mg^{++}$ to the aqueous sodium carbonate solution, prior to precipitation of sodium carbonate so that at least about 400 p.p.m. $Ca^{++}$ and $Mg^{++}$ (as calcium carbonate on a soda ash basis) are found in the precipitated sodium carbonate, provided that the minimum amounts of $Ca^{++}$ and $Mg^{++}$ (as calcium carbonate on a soda ash basis) found in the precipitated sodium carbonate are, respectively, about 260 and about 100 p.p.m. (as calcium carbonate on a soda ash basis).

2. The process of claim 1 wherein said improvement comprises adding $Ca^{++}$ and $Mg^{++}$ to the aqueous sodium carbonate solution prior to precipitation of sodium carbonate so that about 400 to 650 p.p.m. $Ca^{++}$ and $Mg^{++}$ (as calcium carbonate on a soda ash basis) are found in the precipitated sodium carbonate, provided that the minimum amounts of $Ca^{++}$ and $Mg^{++}$ found are, respectively, 260 and 100 p.p.m. (as calcium carbonate on a soda ash basis) and the maximum amounts of $Ca^{++}$ and $Mg^{++}$ found are, respectively, 450 and 250 p.p.m. (as calcium carbonate on a soda ash basis).

3. The process of claim 2 wherein said added $Ca^{++}$ and $Mg^{++}$ are added in the forms calcium chloride and magnesium chloride.

4. The process of claim 1 wherein said process is a continuous one.

References Cited

UNITED STATES PATENTS

| | | | |
|---|---|---|---|
| 2,861,867 | 11/1958 | Hirsch | 23—63 |
| 3,131,996 | 5/1964 | Seglin et al. | 23—63 |
| 3,350,167 | 10/1967 | McMullen et al. | 23—61 |

OSCAR R. VERTIZ, Primary Examiner

G. T. OZAKI, Assistant Examiner

U.S. Cl. X.R.

23—300, 302

PO-1050
(5/69)

UNITED STATES PATENT OFFICE
CERTIFICATE OF CORRECTION

Patent No. 3,459,497      Dated August 5, 1969

Inventor(s) Joseph S. Coglaiti, Jr., and Daniel J. Masterson

It is certified that error appears in the above-identified patent and that said Letters Patent are hereby corrected as shown below:

Column 2, line 23, "440 p.p.m." should read -- 400 p.p.m. --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents